Feb. 6, 1968 G. P. BAYNES 3,367,452
SELF-ENERGIZING DISC BRAKE WITH WHEEL CYLINDER
MOUNTED PARALLEL TO DISC
Filed Dec. 8, 1966 2 Sheets-Sheet 1

INVENTOR.
Gene P. Baynes
BY
ATTORNEY

INVENTOR.
Gene P. Baynes
ATTORNEY

United States Patent Office 3,367,452
Patented Feb. 6, 1968

3,367,452
SELF-ENERGIZING DISC BRAKE WITH WHEEL
CYLINDER MOUNTED PARALLEL TO DISC
Gene P. Baynes, Kettering, Ohio, assignor to General
Motors Corporation, Detroit, Mich., a corporation of
Delaware
Filed Dec. 8, 1966, Ser. No. 600,137
8 Claims. (Cl. 188—73)

The invention relates to a disc brake assembly and more particularly to one in which the brake is actuated by a wheel cylinder extending parallel to the plane of disc rotation and acting on levers to engage one brake shoe with the disc, with the disc friction force generated by that disc acting through other levers to engage the brake shoe on the other side of the disc. Structure embodying the invention preferably utilizes a wheel cylinder of the type commonly used in duo-servo drum brake assemblies. In its preferable form the wheel cylinder may be the same as that also used in such assemblies, thereby reducing manufacturing costs and permitting easy replacement of the wheel cylinder assembly when required. The disc brake caliper includes a pair of levers pivotally mounted so that they are engaged by the wheel cylinder push rods to move the outer brake shoe into friction braking engagement with the disc being braked. Other levers are also pivotally mounted on the mounting bracket with ends receiving opposite ends of the outer brake shoe so that the brake reaction force from the friction braking action of the shoe is transmitted through the other levers and used as the force which moves the inner brake shoe into engagement with the disc. In one modification all of the levers at one end of the wheel cylinder and brake shoe configuration may be pivoted on the same pivot bolt. In another configuration the brake shoe apply levers actuated directly by the wheel cylinder are pivoted on different bolts from that of the apply levers which utilize shoe reaction force. In one form only the reaction force of one of the shoes is utilized to apply braking force to the other shoe, with the reaction from that other shoe being taken directly by the mounting bracket. In another form the reaction force from both shoes is utilized in applying one shoe to the disc. It is a feature of the invention to so proportion the levers which transmit brake reaction force in relation to their pivot points, points of receipt of friction braking force, and points of applying braking force to the shoe, that the braking force actually applied to one shoe is substantially the same as the braking force applied to the other shoe. This is accomplished by having the resultant mechanical advantage or lever ratio of the reaction force applying levers being substantially the inverse of the coefficient of friction between the shoes and the disc.

Figure 1:
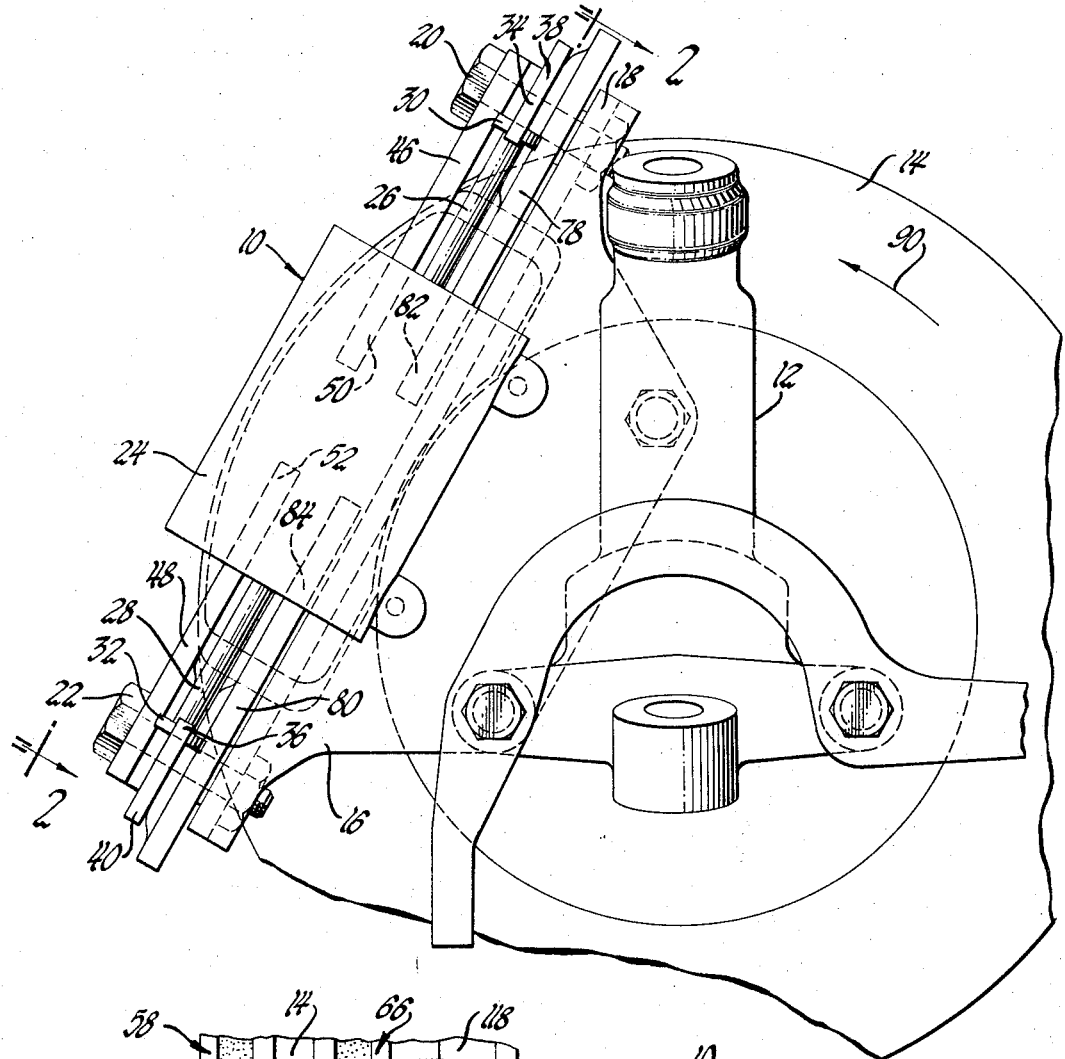
FIGURE 1 is an elevation view, with parts broken away, of a vehicle front wheel disc brake assembly embodying the invention.

The vehicle on which the brake assembly 10 is mounted is shown in FIGURE 1 as including a steering knuckle 12 of the type commonly used for suspending a vehicle front wheel. The vehicle wheel to be braked is suitably rotated on an axle forming a part of the steering knuckle assembly. A disc 14 is operatively secured to the wheel to provide a friction braking structure. A mounting bracket 16 is secured to the steering knuckle assembly 12 and is provided with a reaction flange 18 which is on one side of and extends chordally across a portion of the disc. Pivot bolts 20 and 22 are respectively secured to flange 18 at the opposite ends thereof. A wheel cylinder assembly 24 is mounted on bracket 16 on the opposite side of the bracket from the disc 14 and is preferably of the type commonly utilized in duo-servo drum brake mechanisms. The wheel cylinder assembly has oppositely extending push rods 26 and 28 which extend in a line parallel to the plane of rotation of the disc 14. The push rods are provided with heads 30 and 32, which are suitably slotted to receive the ends 34 and 36 of outer brake shoe assembly levers 38 and 40. These lever ends are also suitably slotted so that the push rod headed ends are retained in position. Levers 38 and 40 are respectively pivotally mounted on pivot bolts 20 and 22. These levers also lie in a plane extending chordally of the disc 14, as seen in FIGURE 1, and are positioned outwardly of the disc so that they clear the disc. The levers 38 and 40 have their other ends 42 and 44 extending toward each other and terminating in spaced relation. Thus levers 38 and 40 form one pair of brake shoe apply levers. The second pair of brake shoe apply levers includes levers 46 and 48. These levers are also respectively pivotally mounted on pivot bolts 20 and 22, and are substantially U-shaped. The lever ends 50 and 52 extend toward each other intermediate the disc 14 and the wheel cylinder assembly 24. The levers 46 and 48 lie in a common plane which is parallel to the plane of levers 38 and 40. The other ends of levers 46 and 48 extend around the disc 14 and inwardly toward each other. Only the end 56 of lever 48 is shown in the drawing. The outer brake shoe 58, comprised of a backing plate 60 and friction pad 62 secured to the backing plate, is slidably received by the lever end 54 and the similar end of lever 46 in abutting relation so that the friction pad is positioned for friction braking engagement with the outer side 64 of the disc 14. The backing plate ends may be notched for this purpose, with the lever ends being received in the notches. The inner brake shoe 66, comprised of backing plate 68 and friction pad 70, is mounted on the other side of the disc 14 so that the pad is frictionally engageable with the disc inner side friction surface 72. The ends of the backing plate are received in sliding and abutting relation by the abutments 74 and 76 formed on reaction flange 18. Thus the reaction to the brake friction force generated by inner shoe 66 is taken directly by the mounting bracket 16.

Figure 2:
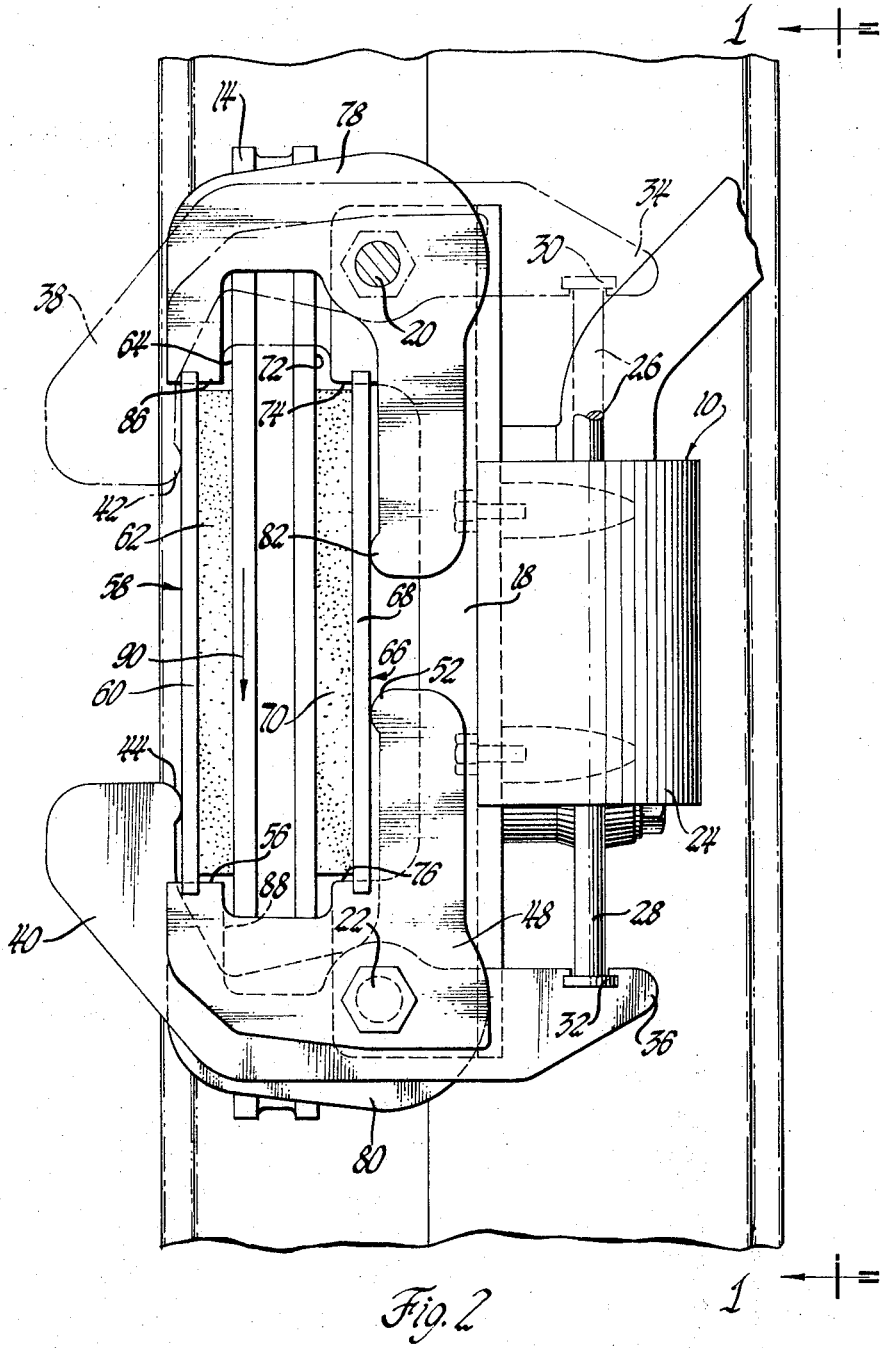
FIGURE 2 is a cross section view of the disc brake assembly of FIGURE 1, with parts broken away, and taken in the direction of arrows 2—2 of that figure.

A third pair of levers 78 and 80 are also preferably provided and pivotally mounted on pivot bolts 20 and 22 on the other side of levers 38 and 40 from levers 46 and 48. Levers 78 and 80 also lie in a plane parallel to the plane of levers 38 and 40. These levers are similar in shape and function to levers 46 and 48. They have inner ends 82 and 84 which extend in the same manner as to lever ends 50 and 52. They have outer ends 86 and 88 which also engage the outer shoe 58 in sliding and abutting relation and also provide reaction for the friction braking force generated by that shoe. The inner ends 50 and 52 of levers 46 and 48 and the inner ends 82 and 84 of levers 78 and 80 engage the inner shoe backing plate 68 so that pivotal movement of those levers because of the braking friction force reaction from outer shoe 58 will cause the inner shoe to move into friction braking engagement with the disc. When the disc is being braked while rotating in a forward direction of rotation, indicated by arrow 90, levers 48 and 80 will be pivoted counter-clockwise, as seen in FIGURE 2, since the brake reaction force will be taken by the outer ends 56 and 88 of these levers. Shoe 58 will tend to move in the direction of rotation of the disc and therefore will not exert a brake reaction force on the levers 46 and 78. If the disc is rotating in the reverse direction, levers 46 and 78 will act in a similar manner.

When the wheel cylinder assembly 24 is energized, the outer shoe brake apply levers 38 and 40 are pivoted to apply outer shoe 58 to the disc in braking relation. The resulting friction braking force causes reaction to be taken by levers 48 and 80, for example, and this force is transmitted through those levers to exert a brake apply force on inner shoe 66. Since the friction braking force generated by outer shoe 58 is a function of the coefficient of friction between the friction pad 62 and the disc friction braking surface 64, the brake apply force exerted on inner shoe 66 will be a function of the mechanical advantage or ratio of the levers which transmit brake reaction thereto and the noted coefficient of friction. Therefore, when it is desirable to have the inner and outer shoes actuated with substantially the same brake apply force, the mechanical advantage or ratio set up by the inner shoe brake apply levers must be the inverse ratio of the coefficient of friction.

Figure 3:
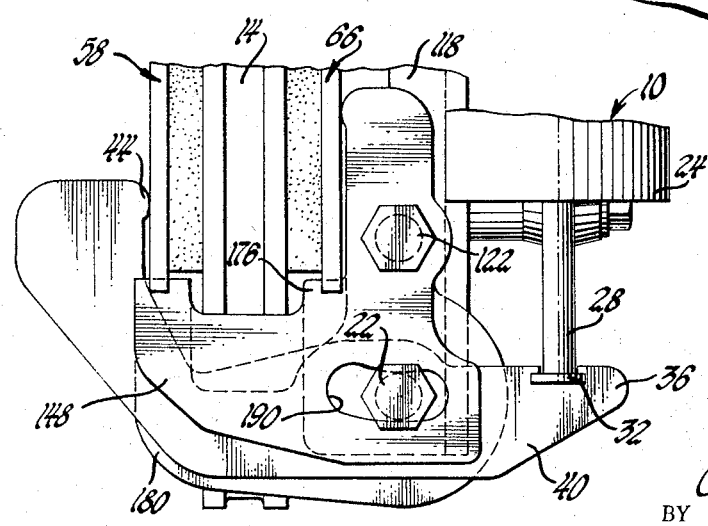
FIGURE 3 is a fragmentary view of a modified disc brake assembly embodying the invention, the view being similar to a part of the view shown in FIGURE 2.

In the modification shown in FIGURE 3, the same wheel cylinder assembly 24, with its push rods, is utilized. Also the same outer brake shoe apply levers are utilized, of which lever 40 is illustrated. The mounting bracket 14 has a modified reaction flange 118, so that no brake friction force reaction generated by the inner shoe 66 is taken on the flange. As illustrated, lever 40 is pivotally mounted on pivot bolt 22 as before. However, the inner shoe apply levers are modified, as illustrated by levers 148 and 180. These levers are pivotally mounted to the flange 118 on other pivot bolts 122. Levers 148 and 180 are slotted, as illustrated at 190, for example, so that they are slidably guided by pivot bolt 22 as they pivot about pivot bolt 122. Levers 148 and 180 are provided with abutments 176 which slidably engage the inner shoe 66 in abutting relation and take reaction of the friction braking force generated by the shoe. In this modification it can be seen that the brake reaction force generated by shoe 58 pivots levers 148 and 180 about bolt 122 to apply shoe 66 to the disc 14 in braking relation. The resultant friction braking force generated by shoe 66 is then applied to reaction abutments 176, which are so positioned that this reaction force also tends to pivot levers 148 and 180 and therefore add to the brake apply force acting on shoe 66. When it is desired that the total brake apply force acting on each of the shoes be substantially equal, the total of the mechanical ratios of the two brake reaction abutments on the levers 148 and 180 and the ends thereof engaging the inner shoe 66 in brake apply relation, as established about pivot bolt 122, should be the inverse of the coefficient of friction of the brake shoes acting on the disc 14. By way of example, if this coefficient of friction were 0.33, the mechanical ratio of the levers 148 and 180 through which the outer shoe reaction is transmitted could be 2.5:1 and the mechanical ratio transmitting the inner shoe reaction force could be 0.5:1, thereby having an effective total ratio of 3:1, which is the inverse of the assumed coefficient of friction.

I claim:
1. A disc brake assembly comprising:
    a rotatable disc to be braked having side friction braking surfaces,
    a caliper mounting bracket having a reaction flange,
    a wheel cylinder having pistons and opposed push rods and mounted on said mounting bracket with said push rods extending substantially parallel to the plane of rotation of said disc,
    pivot bolts in said reaction flange,
    an inner brake shoe having a backing plate and a friction pad on said backing plate engageable with one of said disc friction braking surfaces,
    an outer brake shoe having a backing plate and a friction pad on said backing plate engageable with the other of said disc friction braking surfaces,
    a first pair of brake shoe apply levers, each pivotally mounted on one of said pivot bolts, and having one end engaging a wheel cylinder push rod and the other end engaging said outer brake shoe backing plate whereby powered extension of said push rods causes pivotal movement of said levers about said bolts and forces said outer brake shoe into friction braking engagement with said disc,
    and a second pair of levers, each pivotally mounted on one of said pivot bolts and having one end engaging said outer brake shoe backing plate in brake reaction force receiving relation and the other end engaging said inner brake shoe backing plate whereby brake reaction force generated by said outer brake shoe causes one of said second pair of levers to pivot about the pivot bolt associated therewith and move said inner brake shoe into friction braking engagement with said disc.

2. The disc brake assembly of claim 1,
    said reaction flange having abutments thereon slidably receiving said inner brake shoe backing plate in abutting relation and taking the brake reaction of the friction braking force of said inner shoe.

3. The disc brake assembly of claim 1,
    said second pair of levers each having an abutment formed thereon intermediate said one end and the pivot bolt associated therewith and slidably receiving said inner brake shoe backing plate in abutting relation and taking the brake reaction of the friction braking force of said inner brake shoe whereby the inner brake shoe friction braking force increases the brake apply force exerted on said inner brake shoe.

4. The disc brake assembly of claim 3,
    the ends of said second pair of levers and said lever abutments thereof engaging said inner shoe backing plate being positioned relative to said pivot bolts associated with said second pair of levers, whereby the lever ratios so established total substantially the inverse ratio of the coefficient of friction existing between said shoe friction pads and said disc.

5. The disc brake assembly of claim 1,
    said first pair of levers each being pivoted on one of a first pair of said pivot bolts and said second pair of levers each being pivoted on one of a second pair of said pivot bolts.

6. The disc brake assembly of claim 5,
    each of said second pair of levers having a slot formed therein receiving said first pair of pivot bolts in guided sliding relation.

7. The disc brake assembly of claim 1,
    said pivot bolts associated with said second pair of levers being positioned relative to the ends of said levers to provide a mechanical advantage which is substantially the inverse ratio of the coefficient of friction between the outer shoe friction pad and the disc friction surface engaged thereby.

8. The disc brake assembly of claim 1, further comprising:
    a third pair of levers in substantial alignment with said second pair of levers with said first pair of levers being received intermediate said second and third pairs of levers, each of said pairs of levers operating in a plane parallel to the planes of the other pairs of levers.

References Cited

FOREIGN PATENTS 1,078,886  3/1960  Germany.

MILTON BUCHLER, *Primary Examiner.*

G. E. HALVOSA, *Assistant Examiner.*